US012799994B2

(12) United States Patent
Shahin

(10) Patent No.: US 12,799,994 B2
(45) Date of Patent: Nov. 17, 2026

(54) DRUM BRAKE AND NOISE PREVENTION DEVICE THEREOF

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 416 days.

(21) Appl. No.: 18/385,639

(22) Filed: Oct. 31, 2023

(65) Prior Publication Data

US 2024/0401654 A1 Dec. 5, 2024

(30) Foreign Application Priority Data

May 30, 2023 (DE) ......................... 102023205052.8

(51) Int. Cl.
*F16D 65/00* (2006.01)
*F16D 51/00* (2006.01)
*F16D 65/10* (2006.01)

(52) U.S. Cl.
CPC ......... *F16D 65/0006* (2013.01); *F16D 51/00* (2013.01); *F16D 65/10* (2013.01); *F16D 2051/003* (2013.01)

(58) Field of Classification Search
CPC ............. F16D 65/0006; F16D 2065/13; F16D 2065/1384; F16D 2065/1388; F16D 2065/1392; F16D 2065/1396
See application file for complete search history.

(56) References Cited

U.S. PATENT DOCUMENTS 1,818,447 A * 8/1931 Baker ........................ B60B 3/08 301/6.91
3,630,323 A * 12/1971 Hickle ................ F16D 65/0006 188/18 R
4,475,634 A * 10/1984 Flaim .................. F16D 65/0006 188/73.35
4,796,728 A * 1/1989 Kanengieter ........... F16D 55/38 464/68.41

(Continued)

FOREIGN PATENT DOCUMENTS

DE 2006293 8/1971
DE 8905683 8/1990

(Continued)

OTHER PUBLICATIONS

Machine translation of KR 2008054198 (no date).*

(Continued)

*Primary Examiner* — Nicholas J Lane
(74) *Attorney, Agent, or Firm* — WOMBLE BOND DICKINSON (US) LLP

(57) ABSTRACT

The present disclosure relates to a drum brake and a noise prevention device of the drum brake. The drum brake is provided in a vehicle, and includes a brake drum provided to be mounted on a wheel and including at least one bolt accommodation hole and a noise prevention device connected to one end of an axle shaft and configured to connect an axle flange including at least one bolt hole and the brake drum. Accordingly, vibrations of the axle shaft and the drum brake may be separated to prevent squeal noise.

5 Claims, 5 Drawing Sheets

(56) References Cited

U.S. PATENT DOCUMENTS

| | | | | | |
|---|---|---|---|---|---|
| 5,908,091 | A * | 6/1999 | Berwanger | F16D 65/0006 | 188/73.35 |
| 7,824,107 | B2 * | 11/2010 | Takahashi | B60B 27/0094 | 301/105.1 |
| 10,724,592 | B2 * | 7/2020 | Torstveit | F16D 65/84 | |
| 2003/0067210 | A1 * | 4/2003 | Fielden | B60B 3/145 | 301/35.621 |
| 2013/0221731 | A1 * | 8/2013 | Hess | B29C 45/006 | 301/37.101 |
| 2017/0058994 | A1 * | 3/2017 | Lim | B60B 7/04 | |
| 2020/0158222 | A1 * | 5/2020 | Xu | F16C 19/527 | |

FOREIGN PATENT DOCUMENTS

| | | | | |
|---|---|---|---|---|
| DE | 102017000905 | A1 * | 8/2018 | F16D 65/02 |
| EP | 0092470 | | 4/1983 | |
| KR | 10-2004-0042548 | A | 5/2004 | |
| KR | 2008054198 | A * | 6/2008 | F16D 65/0006 |
| KR | 10-2012-0078848 | A | 7/2012 | |

OTHER PUBLICATIONS

English abstract for DE 10 2017 000905 (2026).*
German Patent Office Application No. 102023205052.8, Office Action dated Apr. 18, 2024, 7 pages.

* cited by examiner

DRUM BRAKE AND NOISE PREVENTION DEVICE THEREOF

CROSS-REFERENCE TO RELATED APPLICATION

This application claims priority from Germany Patent Application No. 102023205052.8, filed on May 30, 2023, which is hereby incorporated by reference for all purposes as if fully set forth herein.

BACKGROUND

1. Field

Embodiments of the present disclosure relate to a drum brake for separating noise and a noise prevention device of the drum brake.

2. Description of the Related Art

The squeal noise of a drum brake system is generated by a vibration interaction between a lining (a lining holder) and a drum. Then, all other components of the brake system and an axle system begin to vibrate. Due to increases in friction, pressure, and temperature effects or changes, the overall system vibrates near a specific frequency, but in different directions (phases). As a result of the interaction between the components in contact with each other, the system becomes unstable to generate squeal noise, and thus undesirable sound waves diffuse due to vibrations of the components having large surfaces, such as a drum or lining. Accordingly, a driver and people outside a vehicle hear the squeal noise.

For brake suppliers, there is an objective to develop a noiseless and robust braking system regardless of an axle.

The squeal noise is caused by not only axle components (a knuckle, a suspension, an upper control arm, a lower control arm, a stabilizer, and a damper), but also all components including brake components and brake drums. In order to separate the vibrations and natural frequencies of the axle system and the brake system, a portion connecting the two systems is required to be considered. In other words, demands for stable brake systems regardless of surrounding components such as drums and axles are increasing.

SUMMARY

Therefore, it is an aspect of the present disclosure to provide a drum brake capable of separating vibrations of an axle shaft and a noise prevention device of the drum brake.

In accordance with one aspect of the present disclosure, a drum brake provided in a vehicle includes a brake drum provided to be mounted on a wheel and including at least one bolt accommodation hole and a noise prevention device connected to one end of an axle shaft and configured to connect an axle flange including at least one bolt hole and the brake drum.

The noise prevention device may include a circular damping shim including at least one connecting hole and at least one cylindrical hollow shim configured to enter the at least one bolt accommodation hole, wherein the at least one cylindrical hollow shim may be coupled to the at least one connecting hole.

The circular damping shim may be formed of a metal layer.

The circular damping shim may be formed of a metal layer and a rubber layer.

The circular damping shim may be formed of a metal layer of which two surfaces are coated with rubber.

The circular damping shim may be formed of a metal layer, a rubber layer, and a bonding layer.

A thickness of the metal layer may be in a range of 0.6 mm to 1 mm.

A thickness of the rubber layer may be in a range of 0.2 mm to 0.4 mm.

In accordance with another aspect of the present disclosure, a noise prevention device of a drum brake is provided to connect an axle flange and a brake drum, wherein the axle flange is connected to one end of an axle shaft and includes at least one bolt hole, and the brake drum is provided to be mounted on a wheel and includes at least one bolt accommodation hole.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
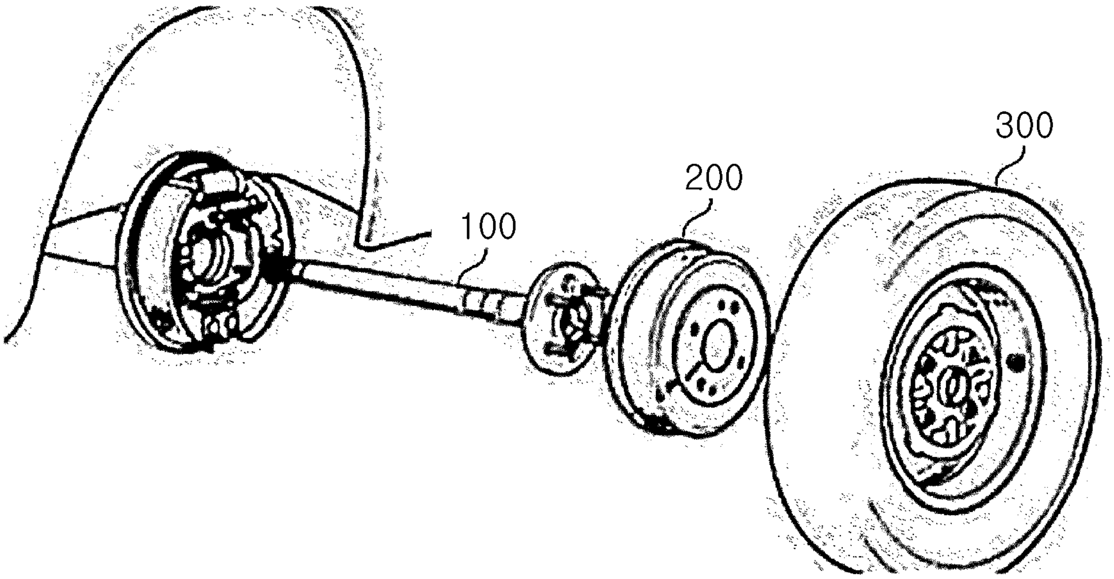
FIGS. 1 and 2 are views illustrating a coupling structure of a drum brake and an axle for a conventional vehicle.

Like reference numerals denote like elements throughout the specification. In the specification, all elements of the embodiments are not described, and general contents in the art or repeated contents between the embodiments will not be described. Terms such as parts, modules, members, and blocks may be realized using a software or hardware, and a plurality of parts, modules, members, and blocks are realized in a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Terms such as first, second, and the like are used herein to distinguish one element from another element, and the elements are not limited to the above-described terms.

As used herein, singular forms "a" and "an" are intended to include the plural forms as well, unless the context clearly indicates otherwise.

Reference numerals in operations are used for the sake of convenience in description and do not describe an order of the operations, and the operations may be performed through an order different from the described order unless the context clearly indicates a specific order.

Hereinafter, an operational principle and embodiments of the disclosure will be described with reference to the accompanying drawings.

Figure 2:
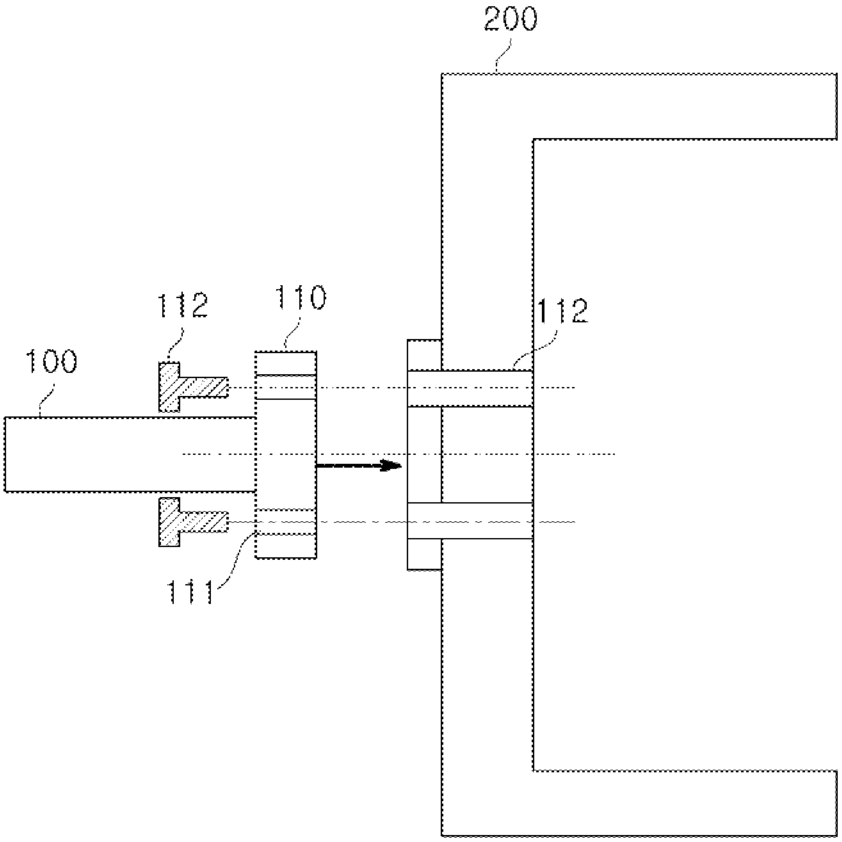

FIGS. 1 and 2 are views illustrating a coupling structure of a brake drum 200 and an axle for a conventional drum brake.

As illustrated in FIG. 1, the vehicle includes an apparatus for connecting an axle and a wheel. More specifically, a driving force may be transmitted from an engine to a wheel through an axle shaft 100, an axle flange 110, the brake drum 200, and a wheel 300, or a braking force may be transmitted through a pedal force of a pedal.

Referring to FIG. 2, the coupling structure of the brake drum 200 and the axle of the conventional drum brake will be described, wherein one end of the axle shaft 100 is connected to the axle flange 110. The axle flange 110 may include at least one bolt hole 111. According to one embodiment, the bolt hole 111 may be provided as four or five bolt holes 111. However, the present disclosure is not limited thereto, and the number of bolt holes 111 may vary according to a design.

A bolt 112 may be coupled to the bolt hole 111 of the axle flange 110, and a length of the bolt 112 may be greater than a length of the bolt hole 111 so that the bolt 112 may enter a bolt accommodation hole (not shown) formed in an outer circumferential surface of the brake drum 200.

As described above, the coupling structure of the brake drum 200 and the axle of the conventional drum brake is a structure which is difficult to prevent vibrations of the brake system and an axle system from interacting.

Figure 3:
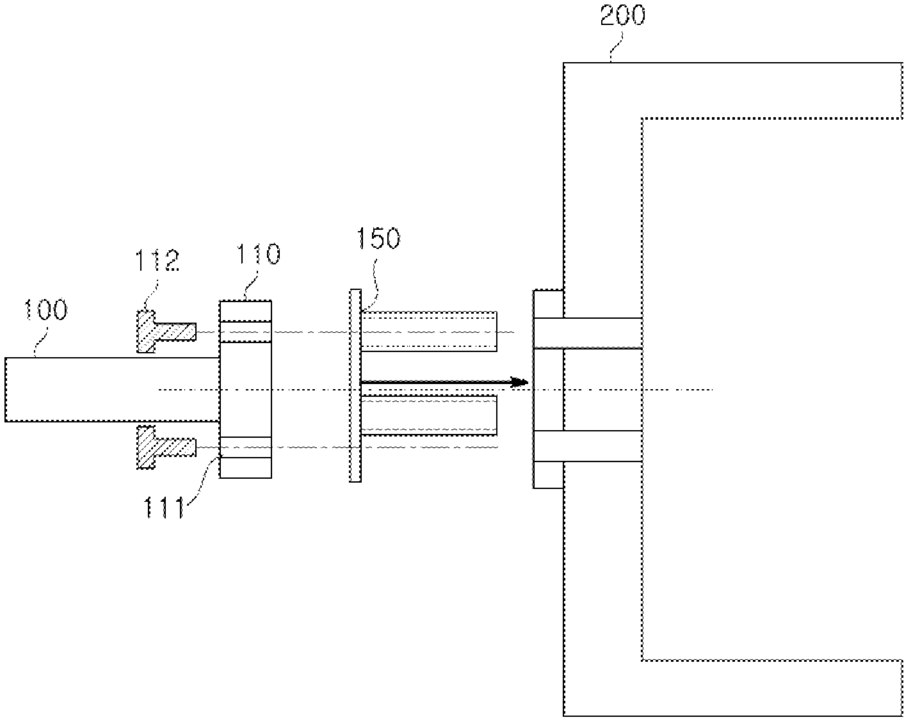
FIG. 3 is a view illustrating a coupling structure of a drum brake, a noise prevention device, and an axle according to one embodiment.

FIG. 3 is a view illustrating a coupling structure of a drum brake, a noise prevention device 150, and an axle according to one embodiment.

Referring to FIG. 3, the drum brake and the noise prevention device of the drum brake may be formed as follows. The coupling structure of the drum brake, the noise prevention device 150, and the axle may include the axle including an axle shaft 100 and an axle flange 110, a brake drum 200 of the drum brake, and the noise prevention device 150 connecting the axle flange 110 and the brake drum 200 to connect the axle and the drum brake.

One end of the axle shaft 100 is connected to the axle flange 110. The axle flange 110 may include at least one bolt hole 111. According to one embodiment, the bolt hole 111 may be provided as four or five bolt holes 111. However, the present disclosure is not limited thereto, and the number of bolt holes 111 may vary according to a design.

A bolt 112 is coupled to the bolt hole 111 of the axle flange 110, and the length of the bolt 112 is greater than the length of the bolt hole 111 so that bolt 112 enters a bolt accommodation hole (not shown) formed in an outer circumferential surface of the brake drum 200.

The brake drum 200 is provided to be mounted on a wheel 300 and may include at least one bolt accommodation hole (not shown).

The noise prevention device 150 may include a damping shim 151, including at least one connecting hole 153 and at least one cylindrical hollow shim 152.

The at least one cylindrical hollow shim 152 may be formed to be coupled to the at least one connecting hole 153. In addition, the at least one cylindrical hollow shim 152 may enter the at least one bolt accommodation hole (not shown) provided in the brake drum 200. Accordingly, bolt 112 passing through bolt hole 111 of axle flange 110 may enter or may be inserted into the cylindrical hollow shim 152, which enters the bolt accommodation hole (not shown).

According to one embodiment, the cylindrical hollow shim 152 may be a screw hollow shim. That is, an outer portion of the cylindrical hollow shim 152 may enter the bolt accommodation hole (not shown) through screw rotation, and bolt 112 passing through bolt hole 111 may enter an inner portion of the cylindrical hollow shim 152 through screw rotation.

Due to such a dual structure, even when the noise prevention device 150 connects between the axle and the drum brake, the coupling structure may be more rigidly formed.

According to another embodiment, a noise prevention device 150 may include a circular damping shim 151 including at least one connecting hole 153. Accordingly, a bolt hole 111 of an axle flange 110 and a bolt 112 passing through the connecting hole 153 may enter or may be inserted into a bolt accommodation hole (not shown) of a brake drum 200. That is, the circular damping shim 151 may be formed to have only at least one connecting hole 153.

The number of bolts 112, the number of bolt holes 111, the number of connecting holes 153, the number of cylindrical hollow shims 152, and the number of bolt accommodation holes may be the same.

Figure 4:
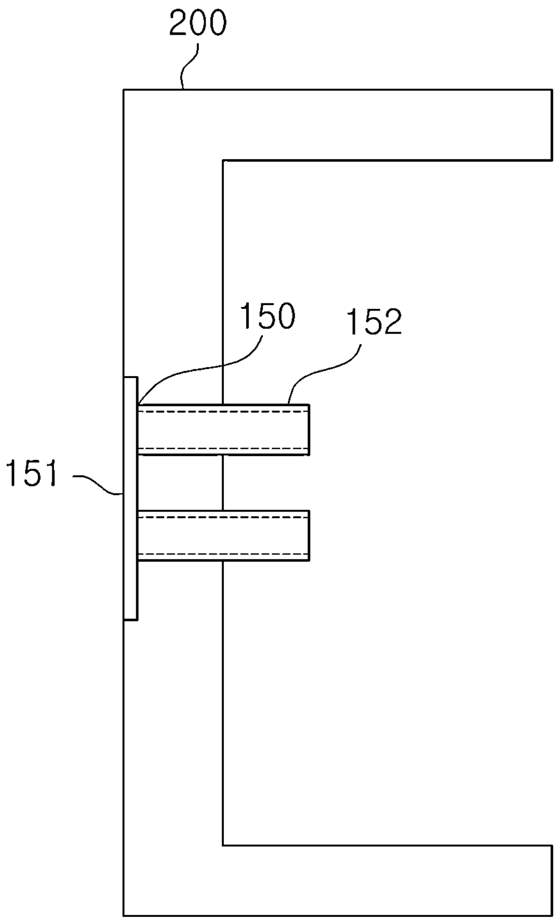
FIG. 4 is a view illustrating a drum brake including a noise prevention device according to one embodiment.

FIG. 4 is a view illustrating a drum brake including the noise prevention device 150 according to one embodiment.

Referring to FIG. 4, the drum brake may include a brake drum 200, at least one bolt accommodation hole (not shown) provided in the brake drum 200, and the noise prevention device 150.

The noise prevention device 150 may include a circular damping shim 151 including at least one connecting hole 153, and at least one cylindrical hollow shim 152 which may enter at least one bolt accommodation hole (not shown). The at least one cylindrical hollow shim 152 may be coupled to the at least one connecting hole 153.

According to one embodiment, the circular damping shim 151 may be formed of a metal layer.

According to one embodiment, the circular damping shim 151 may be formed of a metal layer and a rubber layer.

According to one embodiment, the circular damping shim 151 may be formed of a metal layer of which two surfaces are coated with rubber.

According to one embodiment, the circular damping shim 151 may be formed of a metal layer, a rubber layer, and a bonding layer.

According to one embodiment, a thickness of the metal layer may be in the range of 0.6 mm to 1 mm.

According to one embodiment, a thickness of the rubber layer may be in the range of 0.2 mm to 0.4 mm.

Figure 5:
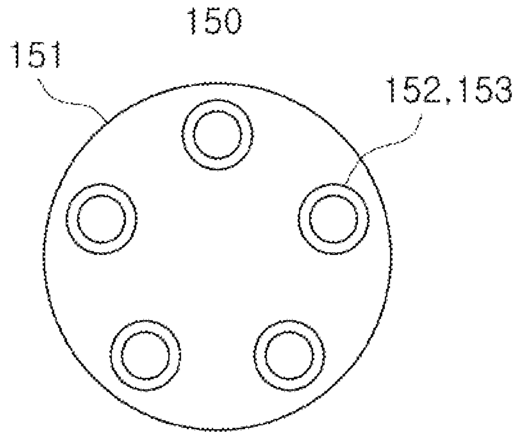
FIG. 5 is a cross-sectional view illustrating the noise prevention device according to one embodiment.

FIG. 5 is a cross-sectional view illustrating the noise prevention device 150 according to one embodiment.

Referring to FIG. 5, the noise prevention device 150 may include a circular damping shim 151 and at least one connecting hole 153.

According to one embodiment, the noise prevention device 150 may further include at least one cylindrical hollow shim 152 which may be coupled to the at least one connecting hole 153.

According to one embodiment, the circular damping shim 151 may be formed of a metal layer.

According to one embodiment, the circular damping shim 151 may be formed of a metal layer and a rubber layer.

According to one embodiment, the circular damping shim 151 may be formed of a metal layer of which two surfaces are coated with rubber.

According to one embodiment, the circular damping shim 151 may be formed of a metal layer, a rubber layer, and a bonding layer.

According to one embodiment, a thickness of the metal layer may be in the range of 0.6 mm to 1 mm.

According to one embodiment, the thickness of the rubber layer may be in the range of 0.2 mm to 0.4 mm.

According to one embodiment, the cylindrical hollow shim 152 may be a screw hollow shim. That is, an outer portion of the cylindrical hollow shim 152 may enter the bolt accommodation hole (not shown) through screw rotation, and bolt 112 passing through bolt hole 111 may enter an inner portion of the cylindrical hollow shim 152.

Due to such a dual structure, even when the noise prevention device 150 connects between an axle and a drum brake, a coupling structure may be more rigidly formed.

According to one aspect of the disclosure, a drum brake capable of separating vibrations of an axle component and a drum brake component and a noise prevention device of the drum brake can be provided.

Accordingly, the drum brake and the noise prevention device of the drum brake can prevent squeal noise.

The above description is only an example describing the technical spirit of the present disclosure, and various changes, modifications, and replacements may be made by those skilled in the art without departing from the essential characteristics of the present disclosure. Therefore, the embodiments disclosed in the present disclosure are considered in a descriptive sense only and not for purposes of limitation, and the scope of the disclosure is not limited by the embodiments. It should be interpreted that the scope of the disclosure is defined by the appended claims and encompasses all modifications and equivalents that fall within the scope of the appended claims.

What is claimed is:

1. A drum brake provided in a vehicle, comprising:

a brake drum configured to be mounted on a wheel and including at least one bolt accommodation hole; and a noise prevention device connected to one end of an axle shaft and configured to connect an axle flange including at least one bolt hole and the brake drum, wherein the noise prevention device includes:

a circular damping shim including at least one connecting hole; and at least one cylindrical hollow shim configured to enter the at least one bolt accommodation hole, and wherein the at least one cylindrical hollow shim is physically coupled to the at least one connecting hole.

2. The drum brake of claim 1, wherein the circular damping shim is formed of a metal layer and a thickness of the metal layer is in a range of 0.6 mm to 1 mm.

3. A noise prevention device of a drum brake, the noise prevention device configured to connect an axle flange and a brake drum, wherein the axle flange is connected to one end of an axle shaft and includes at least one bolt hole, and the brake drum is configured to be mounted on a wheel and includes at least one bolt accommodation hole, wherein the noise prevention device comprises:

a circular damping shim including at least one connecting hole; and at least one cylindrical hollow shim configured to enter the at least one bolt accommodation hole, and wherein the at least one cylindrical hollow shim is physically coupled to the at least one connecting hole.

4. The noise prevention device of claim 3, wherein the circular damping shim is formed of a metal layer.

5. The noise prevention device of claim 4, wherein a thickness of the metal layer is in a range of 0.6 mm to 1 mm.

* * * * *